US012106701B2

(12) United States Patent
Wang et al.

(10) Patent No.: US 12,106,701 B2
(45) Date of Patent: Oct. 1, 2024

(54) PIXEL CIRCUIT AND DISPLAY PANEL

(71) Applicant: WUHAN CHINA STAR OPTOELECTRONICS SEMICONDUCTOR DISPLAY TECHNOLOGY CO., LTD., Hubei (CN)

(72) Inventors: Han Wang, Hubei (CN); Tao Chen, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/618,454

(22) PCT Filed: Nov. 30, 2021

(86) PCT No.: PCT/CN2021/134416
§ 371 (c)(1),
(2) Date: Dec. 11, 2021

(87) PCT Pub. No.: WO2023/092616
PCT Pub. Date: Jun. 1, 2023

(65) Prior Publication Data
US 2024/0013707 A1 Jan. 11, 2024

(30) Foreign Application Priority Data
Nov. 24, 2021 (CN) ......................... 202111403446.5

(51) Int. Cl.
*G09G 3/32* (2016.01)

(52) U.S. Cl.
CPC ....... *G09G 3/32* (2013.01); *G09G 2300/0426* (2013.01); *G09G 2300/0819* (2013.01);
(Continued)

(58) Field of Classification Search
CPC ............ G09G 3/32; G09G 2300/0426; G09G 2300/0819; G09G 2300/0842;
(Continued)

(56) References Cited

U.S. PATENT DOCUMENTS

2017/0148379 A1* 5/2017 Cho ..................... G09G 3/3233
2017/0294162 A1* 10/2017 Hu ....................... G09G 3/3233
(Continued)

FOREIGN PATENT DOCUMENTS

CN 109903724 A 6/2019
CN 110085170 A 8/2019
(Continued)

OTHER PUBLICATIONS

Machine translation of CN 111883044 (Year: 2020).*
(Continued)

*Primary Examiner* — David Tung
(74) *Attorney, Agent, or Firm* — PV IP PC; Wei Te Chung

(57) ABSTRACT

A pixel circuit and a display panel are provided. The pixel circuit is electrically connected to a gate electrode of the driving transistor through one of a source electrode and a drain electrode of the first transistor, and a transmission terminal of the anti-leakage unit is electrically connected to another one of the source electrode and the drain electrode of the first transistor. Therefore, an electrical potential difference between the one of the source electrode and the drain electrode of the first transistor and the gate electrode of the driving transistor can be reduced, and an occurrence of flicker can be improved or eliminated.

1 Claim, 5 Drawing Sheets

(52) U.S. Cl.
CPC ............... *G09G 2300/0842* (2013.01); *G09G 2300/0861* (2013.01); *G09G 2310/08* (2013.01); *G09G 2320/0247* (2013.01)

(58) Field of Classification Search
CPC ....... G09G 2300/0861; G09G 2310/08; G09G 2320/0247
See application file for complete search history.

(56) References Cited

U.S. PATENT DOCUMENTS

| | | | | |
|---|---|---|---|---|
| 2018/0130410 | A1* | 5/2018 | Gao | G09G 3/3225 |
| 2020/0013337 | A1* | 1/2020 | Cho | G09G 3/3258 |
| 2021/0407419 | A1* | 12/2021 | Li | G09G 3/3258 |
| 2022/0020328 | A1* | 1/2022 | Lim | G09G 3/3258 |
| 2022/0051625 | A1* | 2/2022 | Lai | G09G 3/3233 |
| 2022/0199024 | A1* | 6/2022 | Zhang | G09G 3/3233 |

FOREIGN PATENT DOCUMENTS

| | | | | |
|---|---|---|---|---|
| CN | 111724745 | A | 9/2020 | |
| CN | 111883044 | A | * 11/2020 | G09G 3/30 |
| CN | 112397030 | A | 2/2021 | |
| CN | 112419982 | A | 2/2021 | |
| CN | 212724668 | U | 3/2021 | |
| CN | 112951154 | A | 6/2021 | |
| CN | 214671744 | U | 11/2021 | |
| WO | 2021070368 | A1 | 4/2021 | |

OTHER PUBLICATIONS

International Search Report in International application No. PCT/CN2021/134416,mailed on Jul. 28, 2022.
Written Opinion of the International Search Authority in International application No. PCT/CN2021/134416,mailed on Jul. 28, 2022.
Chinese Office Action issued in corresponding Chinese Patent Application No. 202111403446.5 dated Jul. 5, 2022, pp. 1-10.

* cited by examiner

PIXEL CIRCUIT AND DISPLAY PANEL

FIELD OF INVENTION

The present application relates to display technologies, and more particularly, to a pixel circuit and a display panel.

BACKGROUND OF INVENTION

In the display field, flicker is an important optical performance index of panel display. Flicker can cause eyes to fatigue easily. Therefore, reducing flicker as much as possible is an important research direction of panel display.

In a pixel circuit shown in FIG. 1, a gate electrode of a transistor T1 is electrically connected to one of a source electrode and a drain electrode of a transistor T31, and another one of the source electrode and the drain electrode of the transistor T31 is connected to one of a source electrode and a drain electrode of the transistor T32 and a node D. Another one of the source electrode and the drain electrode of the transistor T32 is electrically connected to one of the source electrode and the drain electrode of the transistor T1. The gate electrode of the transistor T31 and the gate electrode of the transistor T32 are connected to a signal SCAN(N).

An operating process of the above-mentioned pixel circuit includes three operating stages as shown in FIG. 2.

First operating stage T1: A signal SCAN (N−1) is at a low electrical potential, a combination transistor based on transistors T41 and T42 is turned on, resetting an electrical potential of gate electrode of transistor T1. That is, an electrical potential of point Q is reset.

Second operating stage T2: The signal SCAN(N) jumps from high to low, a combination transistor based on transistors T31 and T32, a transistor T7, and a transistor T2 are turned on at the same time, an electrical potential of a data signal DATA is written to the transistor T1, and resetting an anode of the light-emitting device LED1 at the same time.

Third operating stage T3: The signal EM (N) is at a low electrical potential, the transistor T5 and the transistor T6 are turned on at the same time, and the light-emitting device LED1 emits light.

In a process of switching from the second operating stage T2 to the third operating stage T3, the signal SCAN(N) jumps from a high electrical potential to a low electrical potential. Due to a coupling effect, an electrical potential of the node D is raised. Due to an existence of a storage capacitor Cst, a slight change in a electrical potential of point Q can be ignored, causing a electrical potential difference Vds between the drain electrode and the source electrode of the transistor T31 to increase, and a leakage current of the transistor T31 also increases, so that a gate electrical potential of the transistor T1 rises within a frame time, causes the light-emitting current flowing through the light-emitting device LED1 drops, that is, a flicker phenomenon occurs.

It should be noted that the above-mentioned introduction of the background technology is only for a purpose of facilitating a clear and complete understanding of the technical solutions of the present application. Therefore, it cannot be considered that the above-mentioned technical solutions involved are known to those skilled in the art just because it appears in the background art of the present application.

SUMMARY OF INVENTION

The present application provides a pixel circuit and a display panel to alleviate a technical problem of display flicker caused by unstable gate electrical potential of a driving transistor.

First, the present application provides a pixel circuit, including a driving transistor, a first transistor, a second transistor, and an anti-leakage unit. One of a source electrode and a drain electrode of the first transistor is electrically connected to a gate electrode of the driving transistor. One of a source electrode and a drain electrode of the second transistor is electrically connected to another one of the source electrode and the drain electrode of the first transistor. Another one of the source electrode and the drain electrode of the second transistor is electrically connected to one of a source electrode or a drain electrode of the driving transistor. A transmission terminal of the anti-leakage unit is electrically connected to the another one of the source electrode and the drain electrode of the first transistor and one of the source electrode and the drain electrode of the second transistor.

In some embodiments, the pixel circuit further includes a first control line electrically connected to a control terminal of the anti-leakage unit, and the first control line is configured to turn on the anti-leakage unit during a light-emitting stage of the pixel circuit to adjust an electrical potential of the another one of the source electrode and the drain electrode of the first transistor.

In some embodiments, the pixel circuit further includes a first initialization line electrically connected to another transmission terminal of the anti-leakage unit, and the first initialization line is configured to transmit a first initialization signal to adjust an electrical potential of the another one of the source electrode and the drain electrode of the first transistor to an electrical potential of the first initialization signal when the anti-leakage unit is turned on In some embodiments, the pixel circuit further includes a second initialization line, which is electrically connected to the other transmission terminal of the leakage anti-leakage unit, and the second initialization line is configured to transmit a second initialization signal to adjust an electrical potential of the another one of the source electrode and the drain electrode of the first transistor to an electrical potential of the second initialization signal when the anti-leakage unit is turned on. The electrical potential of the second initialization signal is equal to or close to an electrical potential of the gate electrode of the driving transistor in the light-emitting stage.

In some embodiments, the anti-leakage unit further includes a first anti-leakage transistor, and wherein one of a source electrode and a drain electrode of the first anti-leakage transistor is electrically connected to another one of the source electrode and the drain electrode of the first transistor, the source electrode and the drain electrode of the second transistor, and wherein a gate electrode of the first anti-leakage transistor is electrically connected to the first control line, and the another one of the source electrode and the drain electrode of the first anti-leakage transistor is electrically connected to the first initialization line.

In some embodiments, the anti-leakage unit further includes a second anti-leakage transistor, and wherein one of a source electrode and a drain electrode of the second anti-leakage transistor is electrically connected to the another one of the source electrode and the drain electrode of the first anti-leakage transistor, and a gate electrode of the second anti-leakage transistor is electrically connected to the first control line, and another one of the source electrode and the drain electrode of the second anti-leakage transistor is electrically connected to the first initialization line.

In some embodiments, the first control line is configured to transmit a constant voltage signal or a pulse signal; and wherein the constant voltage signal is configured to control at least one of the first anti-leakage transistor and the second anti-leakage transistor to operate in an amplification region or a saturation region.

In some embodiments, the first transistor and the second transistor are both P-channel type polysilicon thin film transistors, and wherein the anti-leakage unit is configured to reduce an electrical potential of the another one of the source electrode and the drain electrode of the first transistor.

In some embodiments, the pixel circuit further includes a second control line and a writing transistor. A gate electrode of the writing transistor is electrically connected to the second control line, a gate electrode of the first transistor, and a gate electrode of the second transistor, and wherein one of the source electrode and the drain electrode of the writing transistor is electrically connected to the one of the source electrode and the drain electrode of the driving transistor or the another one of the source electrode and the drain electrode of the driving transistor, and another one of the source electrode and the drain electrode of the writing transistor is configured to access a corresponding data signal.

In a second aspect, the present application provides a display panel including the pixel circuit in at least one of the above embodiments. The anti-leakage unit includes a first anti-leakage transistor, and wherein a part of the gate electrode of the first anti-leakage transistor overlaps with a projection of one of the source electrode of the first anti-leakage transistor, a channel of the first anti-leakage transistor, the drain electrode of the first anti-leakage transistor a the thickness direction of the display panel, and wherein another part of the gate electrode of the first anti-leakage transistor overlaps with a projection of a protruding part of the first control line, and wherein a non-protruding part of the first control line overlaps with at least part of one of the source electrode and the drain electrode of the first anti-leakage transistor.

By electrically connecting one of the source electrode and the drain electrode of the first transistor to the gate electrode of the driving transistor, and electrically connecting a transmission terminal of the anti-leakage unit to the another of the source electrode and the drain electrode of the first transistor, the pixel circuit and the display panel provided by the present application can reduce an electrical potential difference between the another one of the source electrode and drain electrode of the first transistor and the gate electrode of the driving transistor, thereby reducing a gate leakage of the driving transistor, and improving or eliminating an occurrence of flicker.

DETAILED DESCRIPTION OF EMBODIMENTS

In order to make the purpose, technical solutions, and effects of the present application clearer, the following further describes the present application in detail with reference to the accompanying figures and examples. It should be understood that the specific embodiments described here are only used to explain the present application, and are not used to limit the present application.

Figure 1:
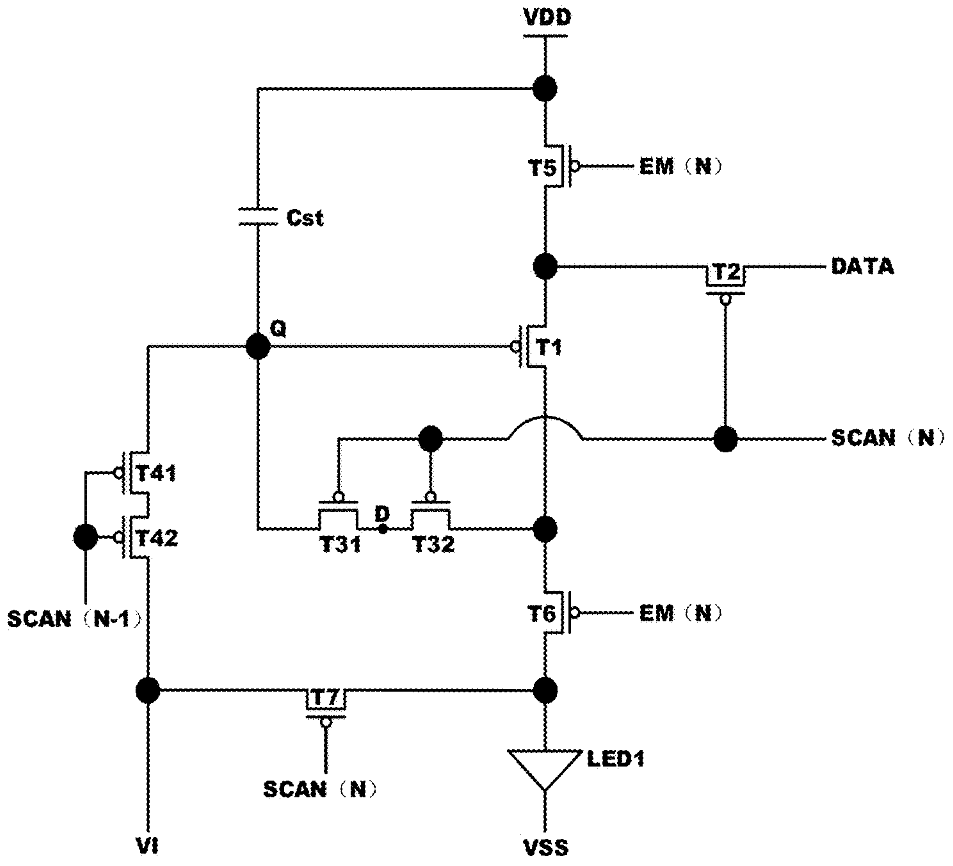
FIG. 1 is a schematic circuit diagram of a pixel circuit in a conventional technical solution.
Figure 2:
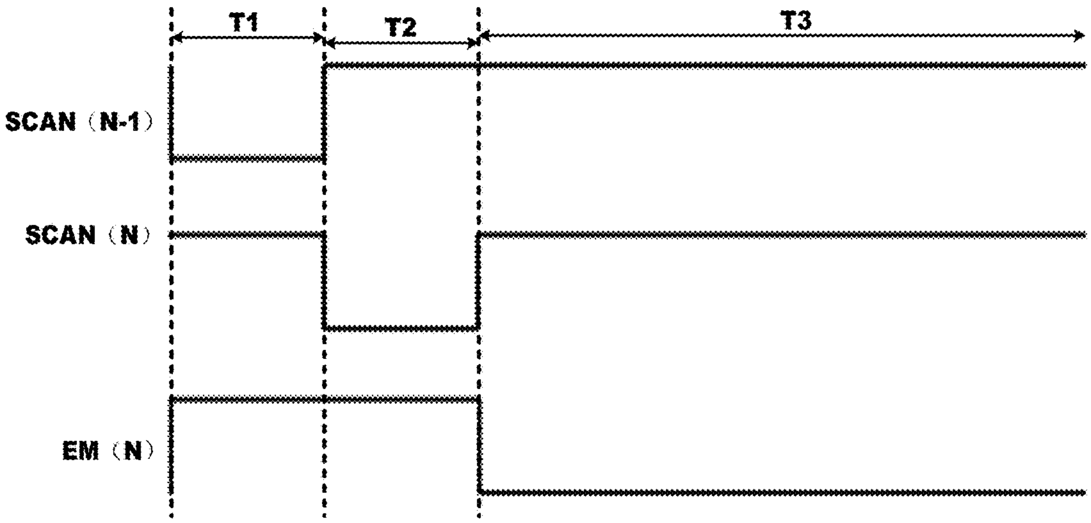
FIG. 2 is a schematic diagram of a timing sequence of the pixel circuit shown in FIG. 1.
Figure 3:
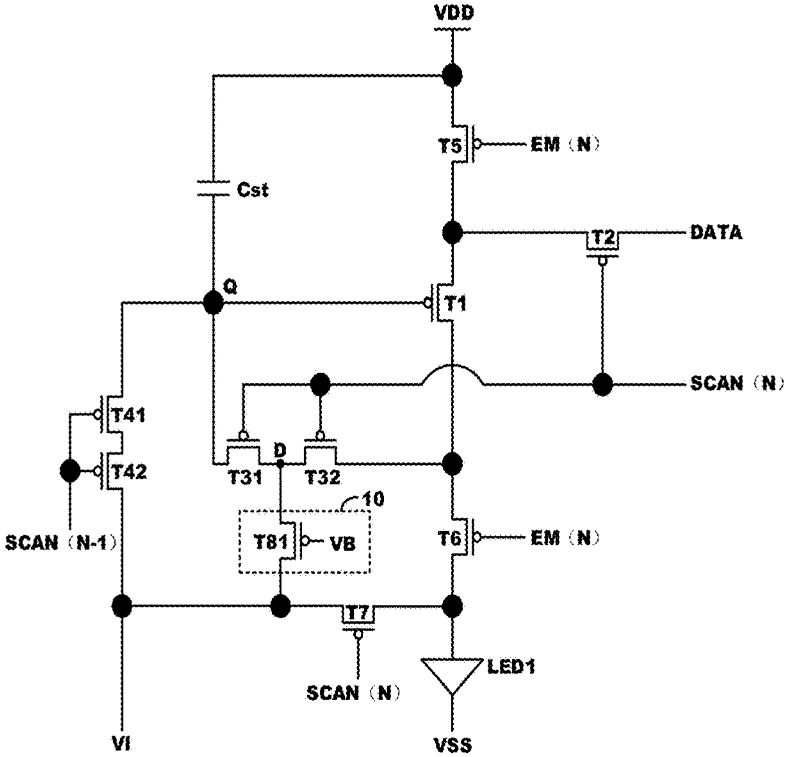
FIG. 3 is a schematic diagram of a first circuit of the pixel circuit provided by one embodiment of the present application.
Figure 4:
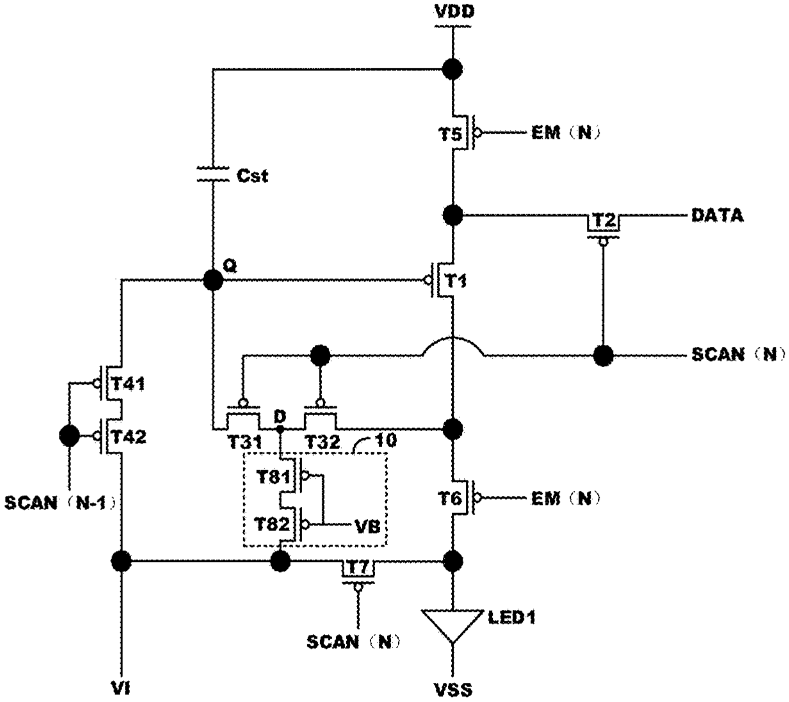
FIG. 4 is a schematic diagram of a second circuit of the pixel circuit provided by one embodiment of the present application.
Figure 5:
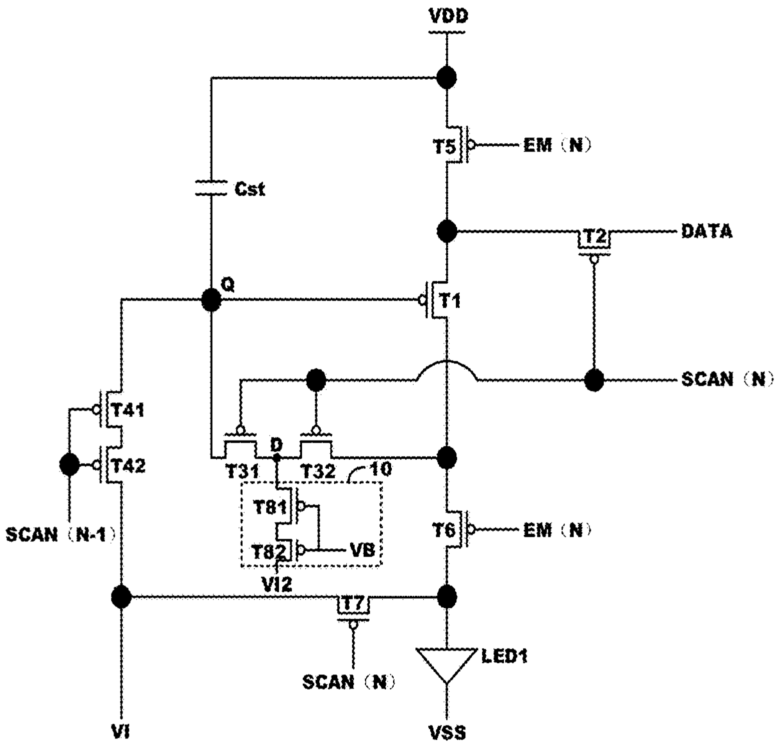
FIG. 5 is a schematic diagram of a third circuit of the pixel circuit provided by one embodiment of the present application.
Figure 6:
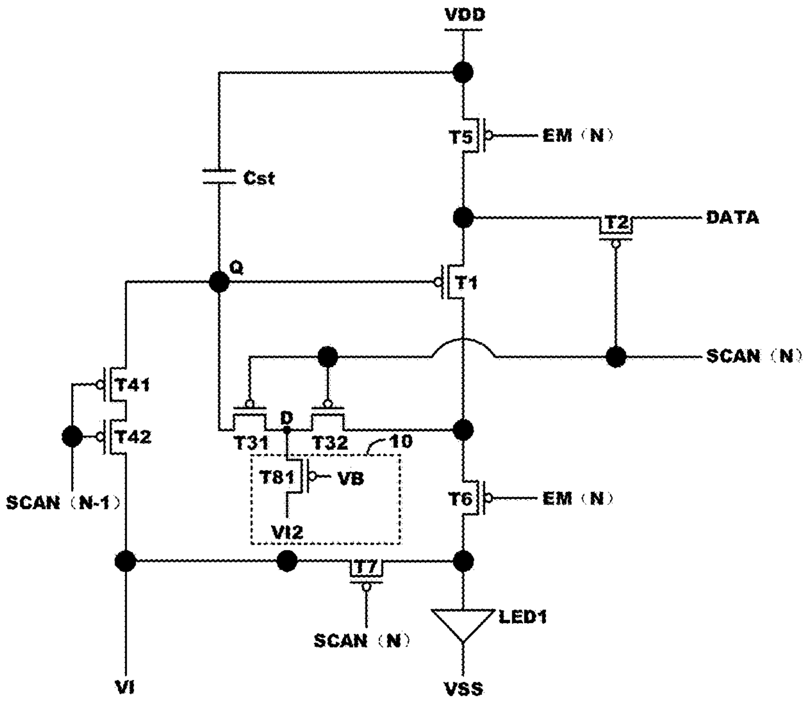
FIG. 6 is a schematic diagram of a fourth circuit of the pixel circuit provided by one embodiment of the present application.

Please refer to FIGS. 3 to 9. As shown in FIGS. 3, 4, and 6, this embodiment provides a pixel circuit, which includes a driving transistor T1, a first transistor T31, a second transistor T32, and an anti-leakage unit 10. One of a source electrode and a drain electrode of the first transistor T31 is electrically connected to a gate electrode of the driving transistor T1. One of a source electrode and a drain electrode of the second transistor T32 is electrically connected to another one of the source electrode and the drain electrode of the first transistor T31. Another one of the source electrode and the drain electrode of the second transistor T32 is electrically connected to one of a source electrode and a drain electrode of the driving transistor T1. A transmission terminal of the anti-leakage unit 10 is electrically connected to the another one of the source electrode and the drain electrode of the first transistor T31 and one of the source electrode and the drain electrode of the second transistor T32, to reduce an electrical potential difference between the another one of the source electrode and the drain electrode of the first transistor T31 and the gate electrode of the driving transistor T1.

It can be understood that, in the pixel circuit provided in this embodiment, one of the source electrode and the drain electrode of the first transistor T31 is electrically connected to the gate electrode of the driving transistor T1, and a transmission terminal of the anti-leakage unit 10 is electrically connected to the another of the source electrode and the drain electrode of the first transistor T31. Therefore, the pixel circuit provided by the present application can reduce an electrical potential difference between the another one of the source electrode and drain electrode of the first transistor and the gate electrode of the driving transistor, thereby reducing a gate leakage of the driving transistor, and improving or eliminating an occurrence of flicker.

The second control line is electrically connected to the gate electrode of the first transistor T31 and the gate electrode of the second transistor T32 to control the first transistor T31 and the second transistor T32 to be turned on or off synchronously.

As shown in FIGS. 3, 4, and 6, in one of the embodiments, the pixel circuit further includes a first control line, which is electrically connected to a control terminal of the anti-leakage unit 10. The first control line is configured to turn on the anti-leakage unit 10 during a light-emitting stage of the pixel circuit to adjust an electrical potential of the another one of the source electrode and the drain electrode of the first transistor T31.

As shown in FIGS. 3, 4, and 6, in one of the embodiments, the pixel circuit further includes a first initialization line. The first initialization line is electrically connected to another transmission terminal of the anti-leakage unit 10. The first initialization line is configured to transmit a first initialization signal VI to adjust an electrical potential of the another one of the source electrode and the drain electrode of the first transistor T31 to an electrical potential of the first initialization signal VI when the anti-leakage unit 10 is turned on.

As shown in FIGS. 3 and 6, in one of the embodiments, the anti-leakage unit 10 includes a first anti-leakage transistor T81. One of a source electrode and a drain electrode of the first anti-leakage transistor T81 is electrically connected to another one of the source electrode and the drain electrode of the first transistor T31 and one of the source electrode and the drain electrode of the second transistor T32. A gate electrode of the first anti-leakage transistor T81 is electrically connected to the first control line, and the another one of the source electrode and the drain electrode of the first anti-leakage transistor T81 is electrically connected to the first initialization line or the second initialization line.

As shown in FIGS. 4 and 5, in one of the embodiments, the anti-leakage unit 10 further includes a second anti-leakage transistor T82. One of a source electrode and a drain electrode of the second anti-leakage transistor T82 is electrically connected to the another one of the source electrode and the drain electrode of the first anti-leakage transistor T81. A gate electrode of the second anti-leakage transistor T82 is electrically connected to the first control line, and another one of the source electrode and the drain electrode of the second anti-leakage transistor T82 is electrically connected to the first initialization line or the second initialization line.

It can be understood that, in this embodiment, the anti-leakage unit 10 includes a first anti-leakage transistor T81 and a second anti-leakage transistor T82, which can improve the leakage of the anti-leakage unit 10 in each pixel circuit in the display panel caused by process fluctuations, and can improve a uniformity of the current difference during display.

As shown in FIG. 6, in one of the embodiments, the pixel circuit further includes a second initialization line. The second initialization line is electrically connected to another transmission terminal of the anti-leakage unit 10. The second initialization line is configured to transmit a second initialization signal VI2 to adjust an electrical potential of the another one of the source electrode and the drain electrode of the first transistor T31 to an electrical potential of the second initialization signal V12 when the anti-leakage unit 10 is turned on. The electrical potential of the second initialization signal V12 is equal to or close to an electrical potential of the gate electrode of the driving transistor T1 in the light-emitting stage.

As shown in FIGS. 3, FIG. 4, and FIG. 6, in one of the embodiments, the pixel circuit further includes a second control line and a writing transistor T2. A gate electrode of the writing transistor T2 is electrically connected to the second control line, a gate electrode of the first transistor T31, and a gate electrode of the second transistor T3. One of the source electrode and the drain electrode of the writing transistor T2 is electrically connected to the one of the source electrode and the drain electrode of the driving transistor T1 or the another one of the source electrode and the drain electrode of the driving transistor T1. Another one of the source electrode and the drain electrode of the writing transistor T2 is configured to access a corresponding data signal DATA. The second control line is configured to transmit a Nth level scan signal.

It can be understood that, in this embodiment, due to the first transistor T31, the second transistor T32, and the writing transistor T2 can use the second control line to perform synchronous on-off control. Therefore, a number of lines required by the pixel circuit is saved, an occupation of the display space is reduced, which is beneficial to increase a pixel density.

As shown in FIGS. 3, 4, and 6, in one of the embodiments, the pixel circuit further includes a storage capacitor Cst. One terminal of the storage capacitor Cst is electrically connected to the gate electrode of the driving transistor T1. Another terminal of the storage capacitor Cst is configured to connect a positive power supply signal VDD.

As shown in FIGS. 3, 4, and 6, in one of the embodiments, the pixel circuit further includes a first light-emitting control transistor T5, a second light-emitting control transistor T6, and a light-emitting device LED1. One of a source electrode and a drain electrode of the first light-emitting control transistor T5 is electrically connected to the another terminal of the storage capacitor Cst. The another one of the source electrode and the drain electrode of the first light-emitting control transistor T5 is electrically connected to the another one of the source electrode and the drain electrode of the driving transistor T1. One of the source electrode and the drain electrode of the second light-emitting control transistor T6 is electrically connected to one of the source electrode and the drain of the driving transistor T1. Another one of the source electrode and the drain electrode of the second light-emitting control transistor T6 is electrically connected to an anode of the light-emitting device LED1. A cathode of the light-emitting device LED1 is configured to connect to a negative power signal VSS. A gate electrode of the first light-emitting control transistor T5 is electrically connected to a gate electrode of the second light-emitting control transistor T6 and is connected to a light-emitting control signal EM (N).

As shown in FIGS. 3, 4, and 6, in one of the embodiments, the pixel circuit further includes a reset transistor T7, one of a source electrode and a drain electrode of the reset transistor T7 is electrically connected to the first initialization line. Another one of the source electrode and the drain electrode of the reset transistor T7 is electrically connected to the anode of the light-emitting device LED1. A gate electrode of the reset transistor T7 is electrically connected to the first control line.

It can be understood that, in this embodiment, since the first transistor T31, the second transistor T32, the writing transistor T2, and the reset transistor T7 can use a same gate control signal, therefore, a number of signals required by the pixel circuit can be reduced.

As shown in FIGS. 3, 4, and 6, in one of the embodiments, the pixel circuit further includes a first initialization transistor T41 and a second initialization transistor T42. One of a source electrode and a drain electrode of the first initialization transistor T41 is electrically connected to the gate electrode of the driving transistor T1. Another one of the source electrode and the drain electrode of the first initialization transistor T41 is electrically connected to one of a source electrode and a drain electrode of the second initialization transistor T42. Another one of the source electrode and the drain electrode of the second initialization transistor T42 is electrically connected to the first initialization line. A gate electrode of the first initialization transistor T41 is electrically connected to the gate electrode of the second initialization transistor T42 and is connected to a N−1th level scanning signal.

In one of the embodiments, at least one of the first transistor T31, the second transistor T32, the writing transistor T2, the driving transistor T1, the first light-emission control transistor T5, the second light-emission control transistor T6, the first anti-leakage transistor T81, the second anti-leakage transistor T82, the reset transistor T7, the first initialization transistor T41, and the second initialization transistor T42 may be a P-channel type polysilicon thin film transistor, and specifically may also be a low temperature polysilicon thin film transistor. In this embodiment, the anti-leakage unit 10 is configured to reduce the electrical potential of the another one of the source electrode and the drain electrode of the first transistor T31.

It can be understood that, as the driving transistor T1, the first transistor T31, and the second transistor T32 adopt N-channel thin film transistors, the anti-leakage unit 10 can also be used to increase an electrical potential of the another one of the source electrode and the drain electrode of the first transistor T31.

Figure 7:
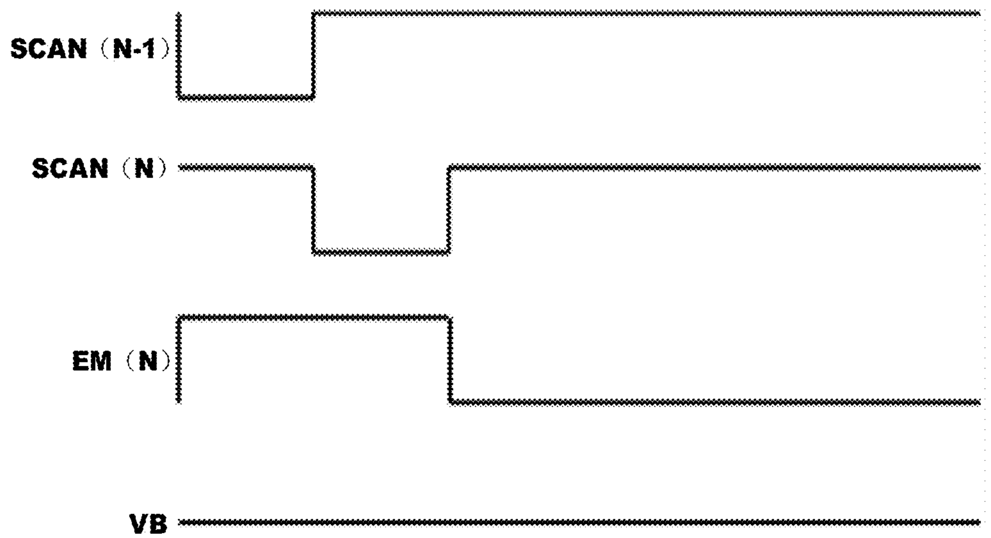
FIG. 7 is a schematic diagram of a first timing sequence of the pixel circuit provided by one embodiment of the present application.

As shown in FIG. 7, the operating process of the above-mentioned pixel circuit may include the following operating stages:

First operating stage: An electrical potential of the N−1 level scan signal SCAN (N−1) is at a low electrical potential. A combination transistor constituted based on the first initialization transistor T41 and the second initialization transistor T42 is turned on, an electrical potential of gate electrode of transistor T1 is reset. That is, an electrical potential of point Q is reset.

Second operating stage: The Nth scan signal SCAN(N) jumps from a high electrical potential to a low electrical potential. A combination transistor constituted based on the first transistor T31 and the second transistor T32, the reset transistor T7, and the writing transistor T2 are turned on at the same time. A electrical potential of the data signal DATA is written to the gate electrode of the transistor T1 or the storage capacitor Cst, and at the same time, the anode electrical potential of the light-emitting device LED1 is reset.

Third operating stage: The light-emission control signal EM(N) is at a low electrical potential. The first light-emission control transistor T5 and the second light-emission control transistor T6 are turned on at the same time, and the light-emitting device LED1 emits light.

During the operation of the above-mentioned pixel circuit, a signal VB transmitted by the first control line can maintain a constant voltage, and the signal VB is configured to control at least one of the first anti-leakage transistor T81 and the second anti-leakage transistor T82 to operate at an amplification region or a saturation region. It can be understood that even when the first anti-leakage transistor T81 or the second anti-leakage transistor T82 is in an incomplete conduction state, there is still a corresponding current flowing through the source and the drain channels of the first anti-leakage transistor T81 or the second anti-leakage transistor T82, which can adjust the electrical potential of the another one of the source electrode and the drain electrode of the first transistor T31.

Figure 8:
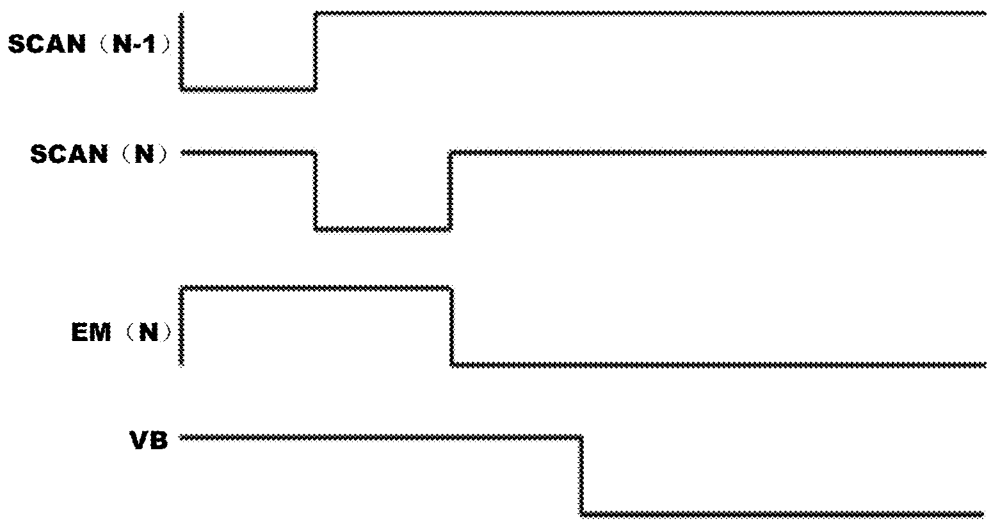
FIG. 8 is a schematic diagram of a second timing sequence of the pixel circuit provided by one embodiment of the present application.

Compared with the operating process shown in FIG. 7, in the operating process shown in FIG. 8, the signal VB can be a pulse signal. For example, in the first and the second operating stages, the signal VB remains at high electrical potential. The anti-leakage transistor T81 or the second anti-leakage transistor T82 is off or at an off state, the signal VB can jump to a low electrical potential during the light-emitting stage. The first anti-leakage transistor T81 and/or the second anti-leakage transistor T82 can be turned on, then the electrical potentials of the gate electrode of the driving transistor T1 and the another one of the source electrode and the drain electrode of the first transistor T31 is close to or equal to each other. At this time, the gate electrode of the driving transistor T1 hardly leaks current.

It can be understood that as the first anti-leakage transistor T81 and/or the second anti-leakage transistor T82 is turned on earlier in the light-emitting stage, the leakage current phenomenon of the gate of the driving transistor T1 can be avoided earlier.

Figure 9:
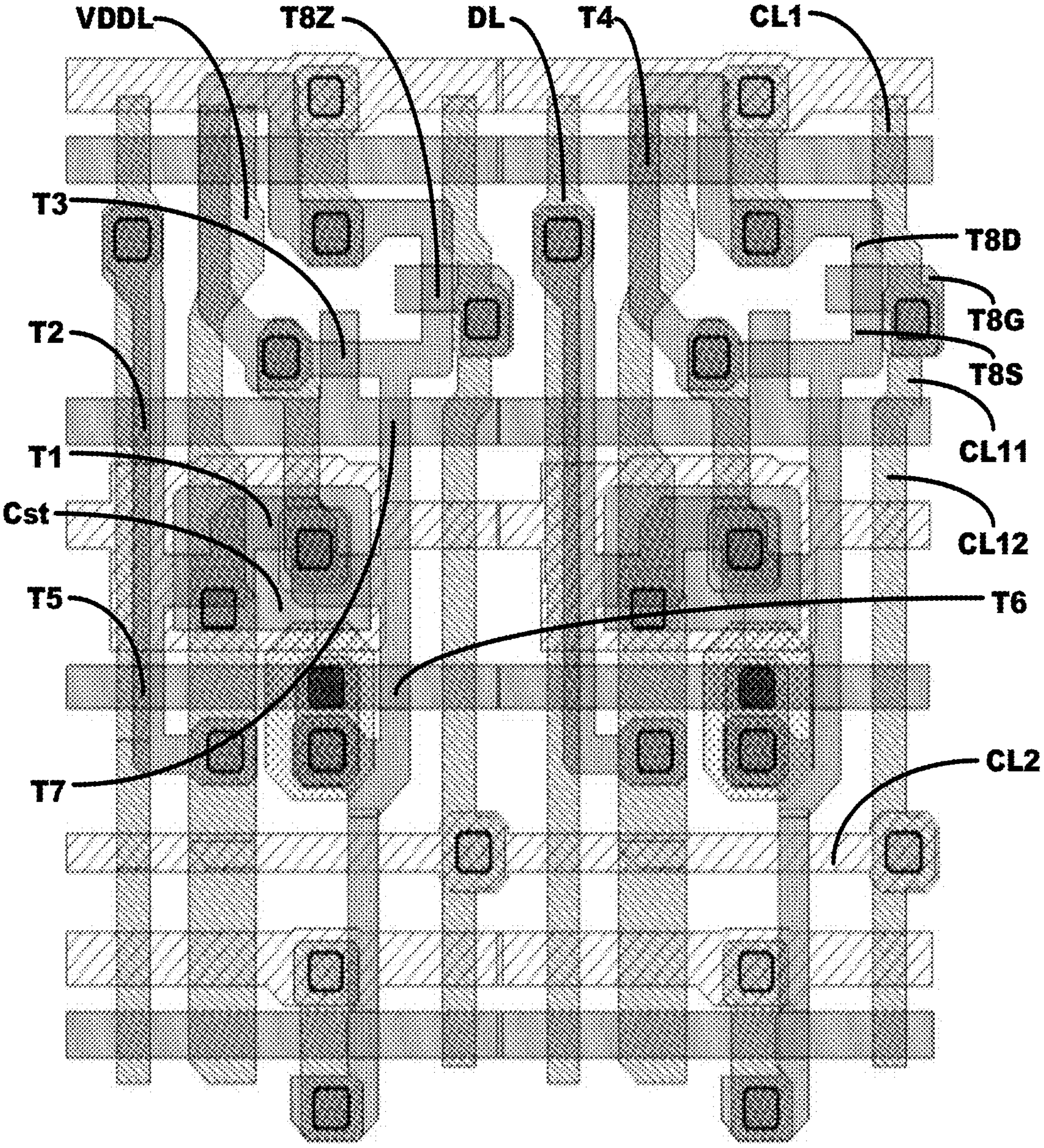
FIG. 9 is a schematic structural diagram of a display panel provided by one embodiment of the present application.

As shown in FIG. 9, in one of the embodiments, this embodiment provides a display panel, which includes the pixel circuit in at least one of the above embodiments. A part of the gate electrode T8G of the first anti-leakage transistor T81 overlaps with a projection of one of the source electrode T8S of the first anti-leakage transistor T81, a channel T8Z of the first anti-leakage transistor T81, the drain electrode T8D of the first anti-leakage transistor T81 in a thickness direction of the display panel. Another part of the gate T8G of the first anti-leakage transistor T81 overlaps with a projection of a protruding part C11 of the first control line CL1, and wherein a non-protruding part CL12 of the first control line CL1 overlaps with at least part of one of the source electrode T8S and the drain electrode T8D of the first anti-leakage transistor T81.

It can be understood that, in the pixel circuit provided in this embodiment, one of the source electrode and the drain electrode of the first transistor T31 is electrically connected to the gate electrode of the driving transistor T1, and a transmission terminal of the anti-leakage unit 10 is electrically connected to the another of the source electrode and the drain electrode of the first transistor T31. Therefore, the pixel circuit provided by the present application can reduce an electrical potential difference between the another one of the source electrode and drain electrode of the first transistor and the gate electrode of the driving transistor, thereby reducing a gate leakage of the driving transistor, and improving or eliminating an occurrence of flicker.

In addition, the first control line CL1 is wired with respect to at least part of the first anti-leakage transistor T81, which can ensure the electrical connection between the two and save a wiring space of the display panel.

The display panel further includes a power positive signal line VDDL, a data line DL, and a line CL2. The line CL2 crosses the first control line CL1 in different layers and is electrically connected to the first control line CL1. The line CL2 and a non-protruding portion CL12 of the first control line CL1 may be perpendicular to each other. A protruding portion CL11 of the first control line CL1 is far away from the source electrode T8S of the first anti-leakage transistor T81 and the channel T8Z of the first anti-leakage transistor T81. The power positive signal line VDDL is configured to transmit the power positive signal VDD. The data line DL is configured to transmit data signals. A signal transmitted in the line CL2 is the same as a signal transmitted in the first control line CL1.

It should be noted that the driving transistor T1, the writing transistor T2, the combination transistor T3 constituted based on the first transistor T31 and the second transistor T32, the combination transistor T4 constituted based on the first initialization transistor T41 and the second initialization transistor T42, the transistor T5, the transistor T6, the transistor T7, the first anti-leakage transistor T81, and the storage capacitor Cst are located in the vicinity of each marked lead in FIG. 9 instead of just a certain point. The nearby region may include multiple film layers of the display panel to at least realize a structure of the pixel circuit in the present application.

It can be understood that, for those of ordinary skill in the art, equivalent replacements or changes can be made according to the technical solutions of the present application and its inventive concept. All these changes or replacements shall fall within a protection scope of the appended claims of the present application.

What is claimed is:

1. A display panel comprising:

a pixel circuit, comprising:

a driving transistor;

a first transistor, wherein one of a source electrode and a drain electrode of the first transistor is electrically connected to a gate electrode of the driving transistor;

a second transistor, wherein one of a source electrode and a drain electrode of the second transistor is electrically connected to another one of the source electrode and the drain electrode of the first transistor, and wherein another one of the source electrode and the drain electrode of the second transistor is electrically connected to one of a source electrode and a drain electrode of the driving transistor; and an anti-leakage unit, wherein a transmission terminal of the anti-leakage unit is electrically connected to the another one of the source electrode and the drain electrode of the first transistor and the one of the source electrode and the drain electrode of the second transistor; and a first control line electrically connected to a control terminal of the anti-leakage unit, and the first control line is configured to turn on the anti-leakage unit during a light-emitting stage of the pixel circuit to adjust an electrical potential of the another one of the source electrode and the drain electrode of the first transistor;

wherein the anti-leakage unit comprises a first anti-leakage transistor, and wherein a part of the gate electrode of the first anti-leakage transistor overlaps with at least one of projections of one of the source electrode of the first anti-leakage transistor, a channel of the first anti-leakage transistor, and the drain electrode of the first anti-leakage transistor in a thickness direction of the display panel, and wherein another part of the gate electrode of the first anti-leakage transistor overlaps with a projection of a protruding part of the first control line in the thickness direction of the display panel, and wherein a non-protruding part of the first control line overlaps with at least part of one of the source electrode and the drain electrode of the first anti-leakage transistor.

* * * * *